March 26, 1929. F. O. CONILL 1,706,956
AUXILIARY AND MOVABLE WINGS TO BE BROUGHT IN USE ON THE
DEPARTURE AND ON THE LANDING OF HIGH SPEED AEROPLANES
Filed Dec. 27, 1926 2 Sheets-Sheet 1

INVENTOR:
Fernan Oscar Conill
By
Chaturn & Company
Attys.

March 26, 1929.   F. O. CONILL   1,706,956
AUXILIARY AND MOVABLE WINGS TO BE BROUGHT IN USE ON THE
DEPARTURE AND ON THE LANDING OF HIGH SPEED AEROPLANES
Filed Dec. 27, 1926   2 Sheets-Sheet 2

INVENTOR:
Fernan Oscar Conill.

By Chatwin & Company
attys.

Patented Mar. 26, 1929.

1,706,956

UNITED STATES PATENT OFFICE.

FERNAN OSCAR CONILL, OF MARSEILLE, FRANCE.

AUXILIARY AND MOVABLE WINGS TO BE BROUGHT IN USE ON THE DEPARTURE AND ON THE LANDING OF HIGH-SPEED AEROPLANES.

Application filed December 27, 1926, Serial No. 157,381, and in France December 29, 1925.

The departure and the landing of a high speed aeroplane always make it necessary to have a large stretch of ground specially prepared and fitted in order to allow the machine to acquire, on the ground, a rather great initial speed, in ratio to the necessarily reduced area of their wings, to enable them to rise in the air; similarly, in order that such a flying machine might normally land, it is a necessity to keep up, in the final drive, a high speed, thus causing the machine to cover a considerable length on the ground before finally coming to a standstill.

This necessity to have, for the use of these apparatus, such a large stretch of ground, constitutes in many cases, an inconvenience which is greatly diminished in the case of a machine having a large wing area, the latter allowing the aeroplane to depart from and to land on a piece of ground much smaller.

The purpose of the invention is to enable the high-speed flying machine to share in the same advantage with the normal machines, this result being obtained by the adjunction of auxiliary movable wings in order to increase the bearing area on the departure and when landing, such increased area enabling the machine to leave and to reach the ground at a much reduced speed, more or less approaching that of the less speedy aeroplanes.

The annexed drawings show a preferred embodiment of the invention, in which.

Underneath the fixed wings A A' (Figs. 1 and 2) are disposed the movable wings B B', exactly following the shape and curves of the fixed wings A A', so as to be able to exactly fit against the latter (position shown in dotted lines in Figs. 1 and 2) and to form together with a single wing.

Figure 1:
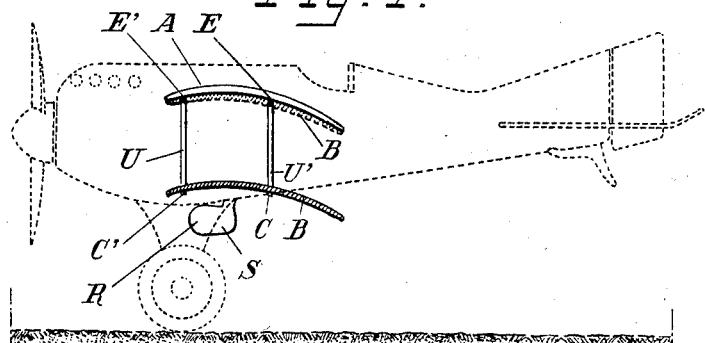
Fig. 1 shows the auxiliary movable wings fitted on a monoplane shown from the side, in dotted lines.
Figure 2:
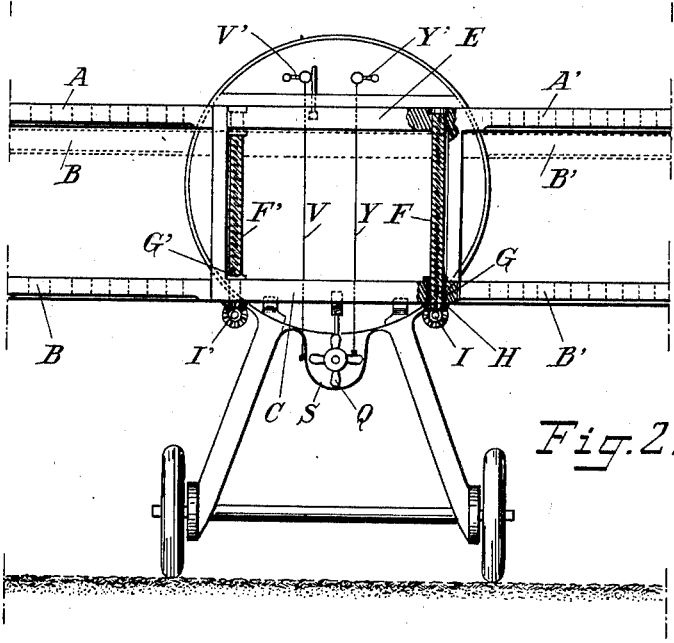
Fig. 2 shows, on a larger scale and with parts cut away a back-view of the actuating device of the movable girder supporting the auxiliary wings.
Figure 3:
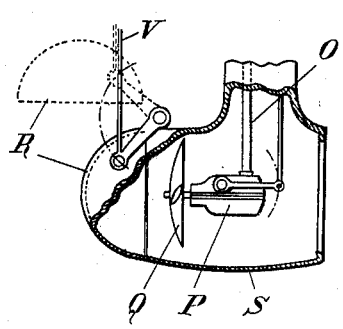
Fig. 3 represents, in a gear-case with parts cut away, the air-turbine driving the actuating device.
Figure 4:
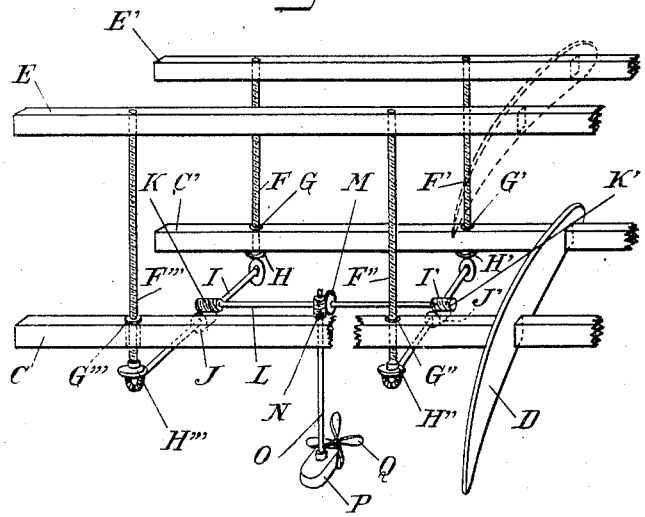
Fig. 4 shows a perspective view of the whole of the frame-work of the fixed and movable wings and of the actuating device connected to the air-turbine.
Figure 5:
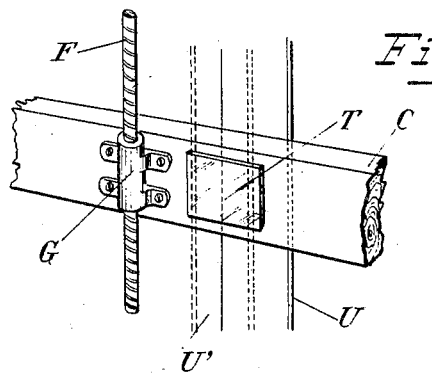
Fig. 5 represents, on a larger scale, another way to actuate the movable girder carrying the auxiliary wings.
Figure 6:
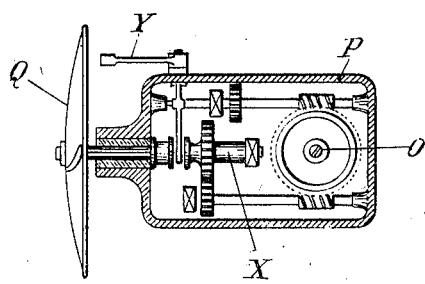
Fig. 6 is a plan of the disposition of the reversing gear driven by the air-turbine for actuating the girder supporting the auxiliary wings.

The movable wings B B' are fixed on girders C C' (Fig. 4) which carry the crosspieces or ribs D on which is fixed the canvas, or other material constituting the bearing area; those girders C C' are connected to the fixed girders E E' by threaded shafts F F' F'' F''', the pitch and the number of threads of which will be made to vary according to the special requirements of the several machines. These shafts are fixed, by their upper ends, to the girders E E' (Figs. 3 and 4). They go right through the movable girders C C' fitted with nuts G G' G'' G''' and carry at their end the cone gears H H' H'' H''', meshing into a corresponding gear wheel placed on each of the ends of the shafts I, I', the latter carrying worm wheels J J', actuated by worm gears K K' fixed on the shaft L, fitted with the wheel M, actuated in turn by the worm-gear N connected by the vertical shaft O to the reversing gear P. The latter is driven, at the proper time, by the air-turbine Q (Figs. 3, 4 and 6) controlled by the motion of the movable hood R rocking over the gear-case S placed below the body of the flying-machine. Fig. 1. Sliding plates T, Fig. 5, are fitted on the sides of the movable girders C C' in order to reduce to a minimum, by their contact with the skates U U', (Figs. 1 and 5) the friction resistance due to the motion of the movable girders C C' as well as to maintain and guide in their normal position the wings B B'.

The working of an aeroplane fitted with these auxiliary wings is as follows:—

At the time of departure of the flying machine, the auxiliary wings B B' occupy the position shown on Fig. 1 and make, for the time being, the monoplane into a biplane, the sustention area being doubled. The hood R is closed and the engine driven through the increase of the bearing area as well as through the acquired speed, the aeroplane quickly rises off the ground. At this juncture the airman lifts up the hood R by pulling the cable V actuated by the hand-lever V'. Now the current of air drives the air-turbine Q and the shaft X (Fig. 6) of the reverse gear in a known manner, the latter being actuated by the lever Y, the cable of which is connected to the hand-lever Y'. This motion is transmitted to the vertical shaft O, which, by means of the gearing already described, actuates the threaded shafts F, F', F'', F''', causing the girders C, C' to rise and, with them, the wings B B', until the latter exactly fit against the fixed upper wings A, A'; this position obtained, the flying machine again becomes a monoplane, the hood R is then closed and the air-turbine Q is no longer driven.

When landing, the gear will be driven by displacing the hand-lever Y'; by means of the hand-lever V' the hood R is raised, and the air turbine Q will drive, in the opposite direction, the gears and the threaded shafts F, F', F'', F''', causing the movable wings B, B' to be lowered. The flying machine is thus transformed into a biplane; its bearing area being doubled, the landing will be effected quickly and normally on a relatively small piece of ground, which could never have been used by a monoplane with fixed wings and having a bearing area calculated for high speeds.

Owing to the use of worms and worm wheels it should be noticed that these mechanical parts constitute as many "brakes", ensuring the immobility of the parts in any given position.

The upward or downward motion of the auxiliary wing may also automatically be stopped by means of a stopping wedge placed on the cable commanding the small hood of the air-turbine.

Having thus described and ascertained the nature of my invention, I declare that what I claim is:—

In a high speed aeroplane, ordinary wings, auxiliary wings, having the same form and shape as the ordinary wings, means for moving the auxiliary wings, to and from the ordinary wings and for laying them smooth against the latter wings, an air-turbine, a gear case, movable hood covering said air-turbine, a hand actuated lever for lifting up and closing said hood, means for connecting said lever to the movable hood, a reverse gear driven by the air turbine and connected to the moving means of the auxiliary wings, a second hand lever for actuating the reverse gear, the whole being so arranged that the biplane may be changed into a monoplane and vice versa.

In testimony whereof I have signed my name to this specification.

FERNAN OSCAR CONILL.